United States Patent
Arakawa (10) Patent No.: US 6,687,446 B2
(45) Date of Patent: Feb. 3, 2004

(54) OPTICAL WAVEGUIDE DEVICE AND MANUFACTURING METHOD THEREFOR

(75) Inventor: Tomiyuki Arakawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 355 days.

(21) Appl. No.: 09/729,766

(22) Filed: Dec. 6, 2000

(65) Prior Publication Data

US 2002/0001446 A1 Jan. 3, 2002

(30) Foreign Application Priority Data

Jun. 28, 2000 (JP) ........................................ 2000-194408

(51) Int. Cl.[7] ................................................ G02B 6/10
(52) U.S. Cl. ........................ 385/129; 385/130; 385/131; 385/132
(58) Field of Search ........................ 385/14, 30, 49–50, 385/65, 40, 83, 130–133, 129; 359/344; 438/29, 31, 23, 109, 25, 27, 65, 67

(56) References Cited

U.S. PATENT DOCUMENTS

| | | | | | |
|---|---|---|---|---|---|
| 6,122,416 | A | * | 9/2000 | Ooba et al. | 385/16 |
| 6,256,441 | B1 | * | 7/2001 | Ogawa | 385/129 |
| 6,304,687 | B1 | * | 10/2001 | Inoue et al. | 385/14 |
| 6,304,706 | B1 | * | 10/2001 | Sugita et al. | 385/129 |
| 6,311,004 | B1 | * | 10/2001 | Kenney et al. | 385/130 |
| 6,360,047 | B1 | * | 3/2002 | Nekado et al. | 385/129 |
| 6,393,185 | B1 | * | 5/2002 | Deacon | 385/50 |

OTHER PUBLICATIONS

Masao Kawachi, "Current Status and Future Trends in Plannar Lightwave Circuit Technologies" NTT R&D, vol. 43, No. 11, pp. 1273–1280 (1994).

* cited by examiner

*Primary Examiner*—Frank G. Font
*Assistant Examiner*—Michael P. Mooney
(74) *Attorney, Agent, or Firm*—Venable; James R. Burdett (57) ABSTRACT

An optical waveguide device having a large difference in specific refractive index and manufacturing method therefor. An embedded silicon oxide layer of a Silicon on Insulator substrate is used as an under cladding 102, a core 103 is formed by processing the silicon layer of this Silicon on Insulator substrate, and an upper cladding 104 is formed by depositing a silicon oxide film on the surface of the Silicon on Insulator substrate. Because the difference in refractive index between silicon and silicon oxide is large, it is possible to achieve an optical waveguide with a large difference in specific refractive index. As a result of increasing the difference in specific refractive index of an optical waveguide, a smaller and lower-cost optical circuit can be achieved. In addition, because a Silicon on Insulator substrate is used, the number of manufacturing processes can be reduced.

4 Claims, 7 Drawing Sheets

OPTICAL WAVEGUIDE DEVICE AND MANUFACTURING METHOD THEREFOR

BACKGROUND OF THE INVENTION

1. Field of the Invention

The present invention relates to a device comprising an optical circuit constituted using an optical waveguide, that is, an optical waveguide device, and a manufacturing method therefor.

2. Description of Related Art

A device, which constitutes an optical circuit using an optical waveguide, has been known for sometime. In this application, this kind of device is referred to as an optical waveguide device.

As a conventional optical waveguide, the device disclosed in "Current Status and Future Trends in Planar Lightwave Circuit Technologies" Masao KAWACHI, NTT R&D Vol. 43, No. 11, 1994, pp.1273–1280, for example, is well known.

In the optical waveguide disclosed in this paper, an under cladding, core, and upper cladding are each formed using a silicon oxide layer. In an optical waveguide, the refractive index of the cladding (under cladding and upper cladding) must be made higher than the refractive index of the core. In the above-mentioned technology, the refractive index of the cladding and the refractive index of the core are made different by making the compositions of the silicon oxide layers different. In the above-mentioned technology, the difference in specific refractive index between the cladding and the core is around 0.25–2%. Further, in this optical waveguide, the thickness of the silicon oxide layers of the under cladding and the upper cladding, respectively, is around 15–30 $\mu$m. Meanwhile, the cross-sectional dimensions of the core are a width of around 4–10 $\mu$m, and a height of around 4–10 $\mu$m.

In a process for manufacturing an optical waveguide, first, a layer constituting an under cladding, and a layer constituting a core are sequentially deposited by spraying silicon oxide glass particulates of a grain diameter of 0.1 $\mu$m on top of a silicon wafer. The raw material gas of these glass particulates have silicon tetrachloride as the main constituent, and comprises $GeO_2$ as a dopant. Glass particulates are produced by hydrolyzing this raw material gas in an oxyhydrogen flame. The composition of the glass particulates in the under cladding layer and core layer can be made different by changing the concentration of the $GeO_2$ dopant.

Next, a transparent silicon oxide glass layer is formed by heating these glass particulate layers in an electric furnace at a high temperature of 1,250° C. or higher. Since the composition of the glass particulates in the under cladding layer and core layer will differ, the refractive indices of these layers will also differ.

Thereafter, the core is processed using reactive ion etching.

Finally, an upper cladding is formed by depositing a layer that covers the upper surface and side surfaces of the core layer using glass particulates of the same composition as the under cladding, and once again applying the same heat treatment as described hereinabove.

In a conventional optical waveguide such as the one described hereinabove, the difference in specific refractive index between the cladding and the core is only 2% or less. That is, in this optical waveguide, the drawback was that the difference in specific refractive index was small.

When this difference in specific refractive index is small, since the radius of curvature of the curved portion of the core must be increased (around 1–25 mm), the optical circuit constituted using this optical waveguide must become larger overall.

Further, when this difference in specific refractive index is small, since the cross-sectional dimensions required for satisfying single mode conditions become large, for example, around 4–10 $\mu$m, fabrication becomes difficult using ordinary semiconductor manufacturing equipment for semiconductor integrated circuits.

Furthermore, in a manufacturing process of a conventional optical waveguide such as that described hereinabove, since a layer constituting an under cladding, and a layer constituting a core, and a layer constituting an upper cladding each had to be deposited, the number of processes was large, and manufacturing costs were high.

SUMMARY OF THE INVENTION

An object of the present invention is to provide an optical waveguide device with a large difference in the specific refractive index of the core and the claddings.

Another object of the present invention is to provide a manufacturing method for inexpensively manufacturing via a simple process an optical waveguide device with a large difference in specific refractive index of the core and the claddings.

An optical waveguide device related to the present invention comprises an under cladding, which is formed using silicon oxide; a core, which is formed on top of the under cladding with silicon, and which propagates light; and an upper cladding, which is formed using silicon oxide, and which covers the side surfaces and upper surface of the core.

According to an optical waveguide device related to the present invention, because a core is formed using silicon, and an under cladding and an upper cladding are formed using a silicon oxide layer, the difference in specific refractive index between the core, and the lower and upper claddings can be increased. Therefore, the radius of curvature of the curved portion of a core can be lessened, and the cross-sectional dimensions can be reduced.

A manufacturing method for an optical waveguide device related to the present invention comprises a process for forming a core by etching a silicon layer of a Silicon-on-Insulator substrate using a mask pattern, and, in addition, for exposing a silicon oxide layer as an under cladding; and a process for forming an upper cladding by depositing a silicon oxide layer on the surfaces of the core and under cladding.

According to the manufacturing method for an optical waveguide device related to the present invention, because an optical waveguide device is manufactured by using a Silicon-on-Insulator substrate, it is possible to reduce the number of manufacturing processes.

BRIEF DESCRIPTION OF THE DRAWINGS

Other objects and advantages of the present invention will be explained by referring to the accompanying figures below.

DESCRIPTION OF THE PREFERRED EMBODIMENTS

The embodiments of the present invention will be explained hereinbelow using the figures. In the figures, the size, shape and arrangement relationship of each component element are schematically shown only to the extent necessary to be able to understand the present invention, and further, the numerical conditions that will be explained hereinbelow are nothing more than mere examples.

First Embodiment

Firstly, an optical waveguide device and manufacturing method therefor related to a first embodiment of the present invention will be explained using FIG. 1–FIG. 4.

Figure 1:
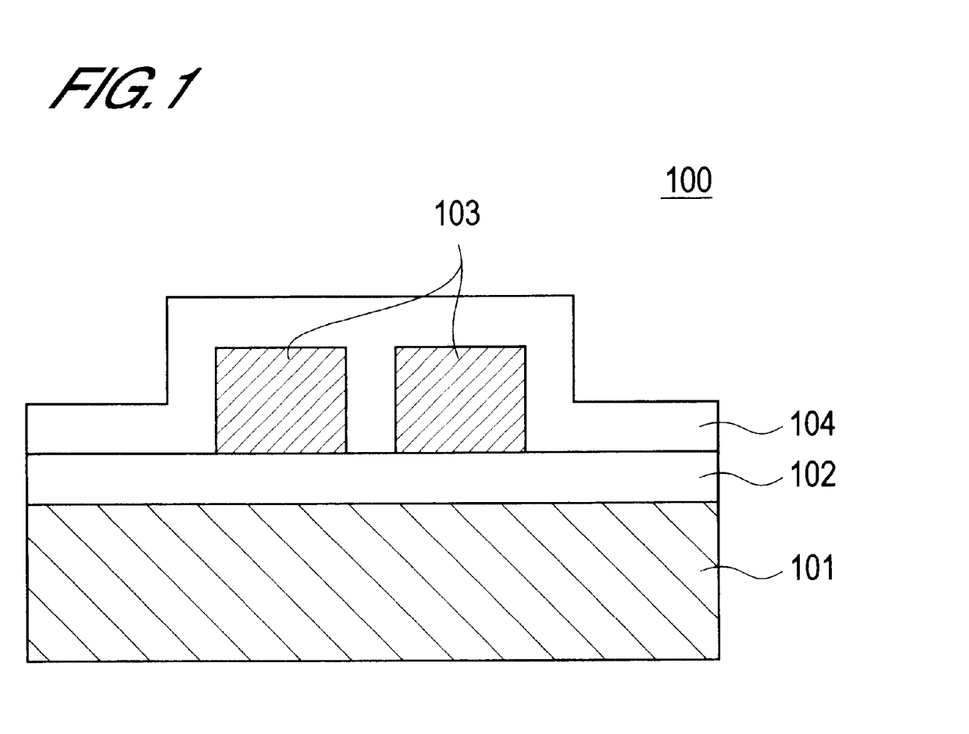
FIG. 1 is a cross-sectional view schematically showing a structure of an optical waveguide device related to a first embodiment.

FIG. 1 is a cross-sectional view schematically showing a structure of an optical waveguide device related to the first embodiment.

As shown in FIG. 1, this optical waveguide device 100 comprises an under cladding 102, a core 103, and an upper cladding 104 formed on top of a silicon substrate 101.

Under cladding 102 is formed using silicon oxide. As will be explained hereinbelow, in this embodiment, a silicon oxide layer embedded in a Silicon-on-Insulator (SOI) wafer is used as under cladding 102.

Core 103 is formed using silicon. As will be explained hereinbelow, in this embodiment, this core 103 is formed by processing the silicon layer of an SOI wafer.

Upper cladding 104 is formed using silicon oxide. Upper cladding 104 has the same refractive index as under cladding 102. As will be explained hereinbelow, in this embodiment, this upper cladding 104 is formed by depositing silicon oxide on top of an SOI wafer.

Next, a manufacturing method for the optical waveguide device shown in FIG. 1 will be explained using FIG. 2.

Figure 2A:
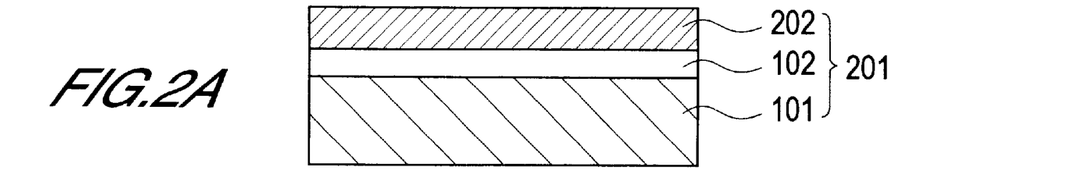
FIG. 2A–FIG. 2D are cross-sectional processing diagrams illustrating a manufacturing method of an optical waveguide device related to the first embodiment.

In this embodiment, as shown in FIG. 2A, a SOI wafer 201 is used. SOI wafer 201 comprises a 1–5 μm thick embedded silicon oxide layer 102, and a 0.1–0.3 μm thick silicon layer 202 layered onto a silicon substrate 101.

When manufacturing optical waveguide device 100, first, SOI wafer 201 is washed for 20 seconds in a 1% solution of hydrofluoric acid, and then rinsed for 5 minutes in demineralized water.

Figure 2B:
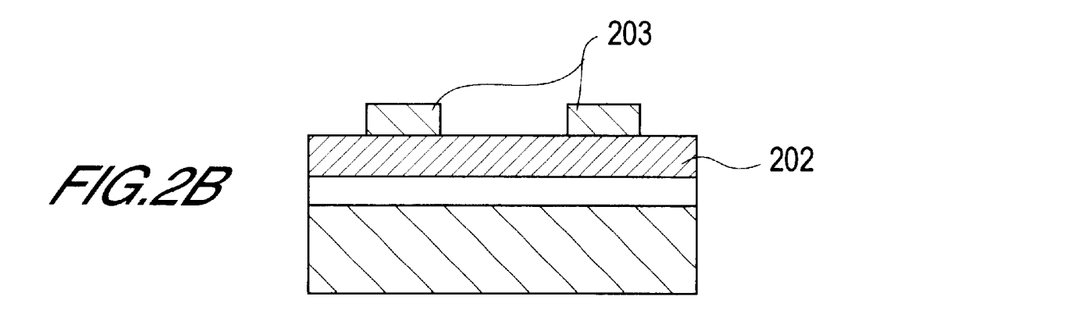

Next, a resist is applied on top of the silicon layer 202 of the SOI wafer 201, and thereafter, a resist pattern 203 is formed as shown in FIG. 2B by using ordinary photolithography technology.

Figure 2C:
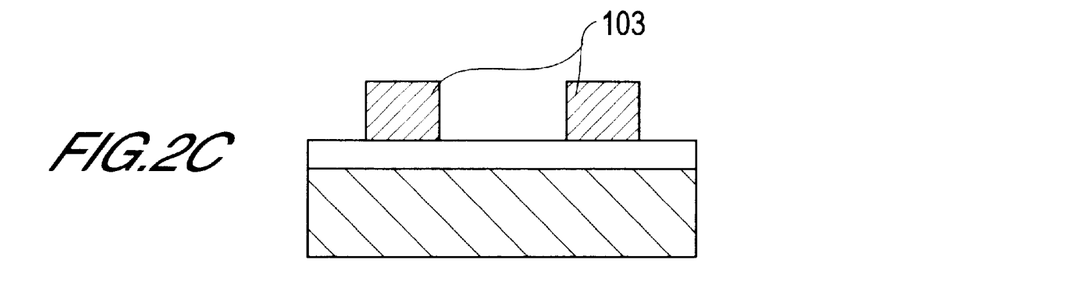

Next, silicon layer 202 is subjected to patterning by performing etching using this resist pattern 203 as a mask. In accordance therewith, cores 103 are formed as shown in FIG. 2C. As an etching method, for example, dry etching can be used. Furthermore, as the etching gas at this time, a gas made by adding 20% $O_3$ to $CF_4$, for example, can be used.

Figure 2D:
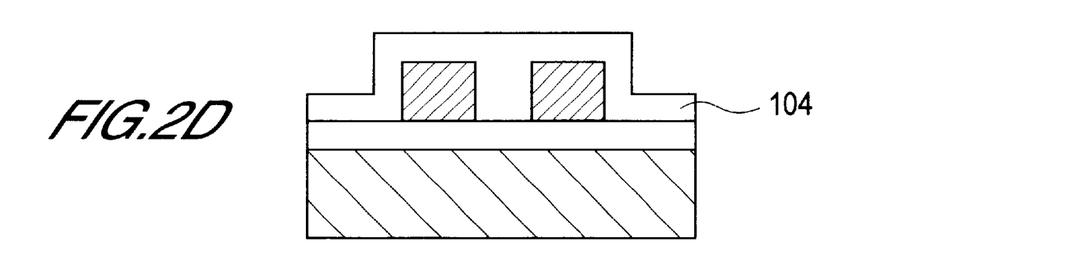

Finally, as shown in FIG. 2D, a 1–5 μm thick silicon oxide layer is deposited as upper cladding 104. As a deposition technique, it is possible to use, for example, a parallel flat plate-type plasma-enhanced chemical-vapor deposition method, sputtering method, or vapor deposition method. Furthermore, as the raw material gas at this time, tetraethoxysilane and $O_2$ can be used.

Next, the characteristics of an optical waveguide device manufactured in this manner will be explained.

The wavelength used in optical telecommunications is generally around 1.3–1.6 μm, and at this wavelength, the silicon refractive index nSi and silicon oxide refractive index $nSiO_2$ are nSi≈3.5, $nSiO_2$≈1.45. Here, the difference in specific refractive index of silicon and silicon oxide can be given as Δn={(nSi−$nSiO_2$)/nSi}×100. Therefore, the difference in specific refractive index Δn of an optical waveguide device 100 related to this embodiment becomes roughly 58%. This difference in specific refractive index Δn is, on average, approximately 50 times that of the difference in specific refractive index (0.25–2%) of the optical waveguide device of the above-mentioned paper.

Figure 3:
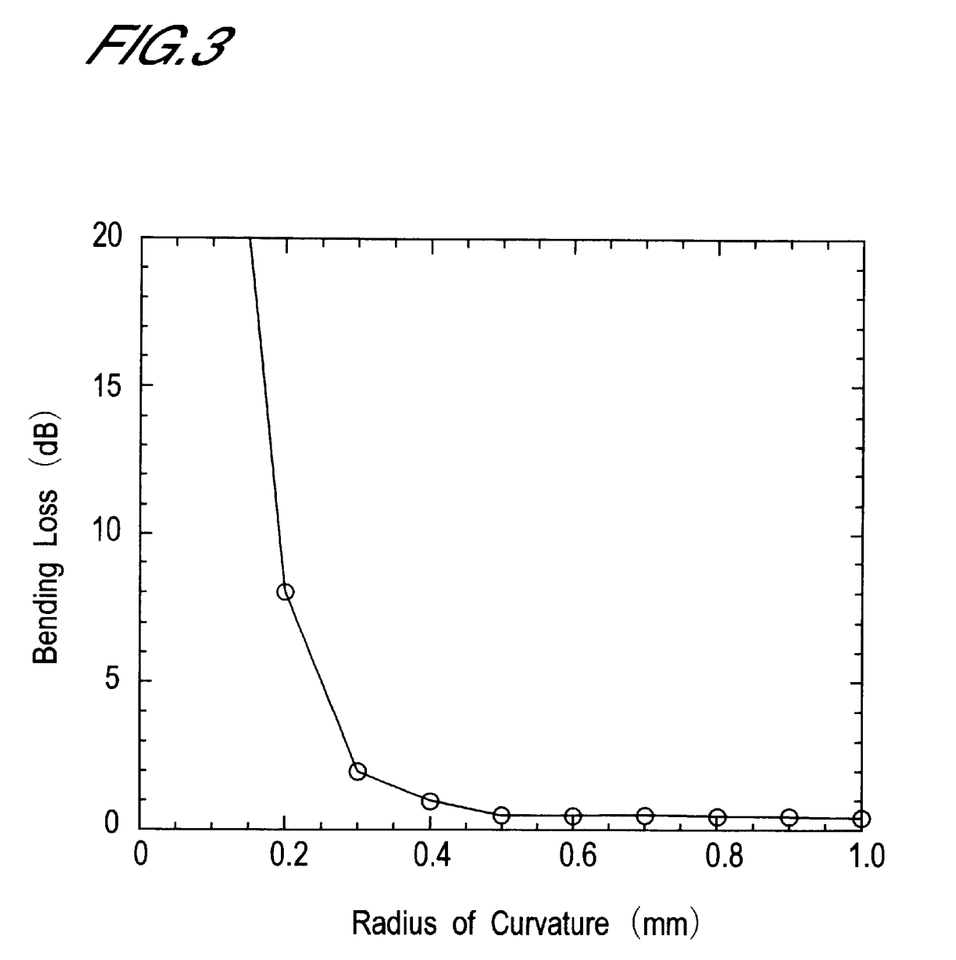
FIG. 3 is graph showing the relationship between the radius of curvature of a core and bending loss in an optical waveguide device related to the first embodiment.

Consequently, in an optical waveguide device 100 related to this embodiment, the radius of curvature of the curved portion of a core can be made to be 0.5–1.0 mm. This value is, on average, less than $\frac{1}{10}^{th}$ that of the value (1–25 mm) in the case of the optical waveguide device on the above-mentioned paper. FIG. 3 is a graph showing the relationship between the radius of curvature of a core and bending loss in optical waveguide device 100. As can be seen from FIG. 3, when the core radius of curvature is 0.5 mm or higher, there is practically no bending loss.

Figure 4A:
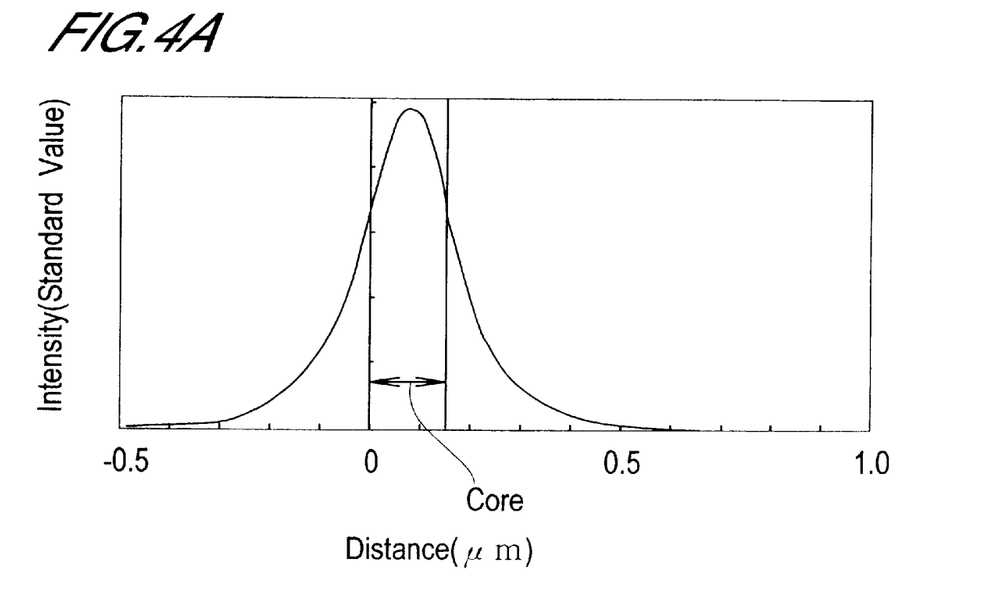
FIG. 4A is a graph showing the results of computing the field distribution in an optical waveguide device related to the first embodiment.
Figure 4B:
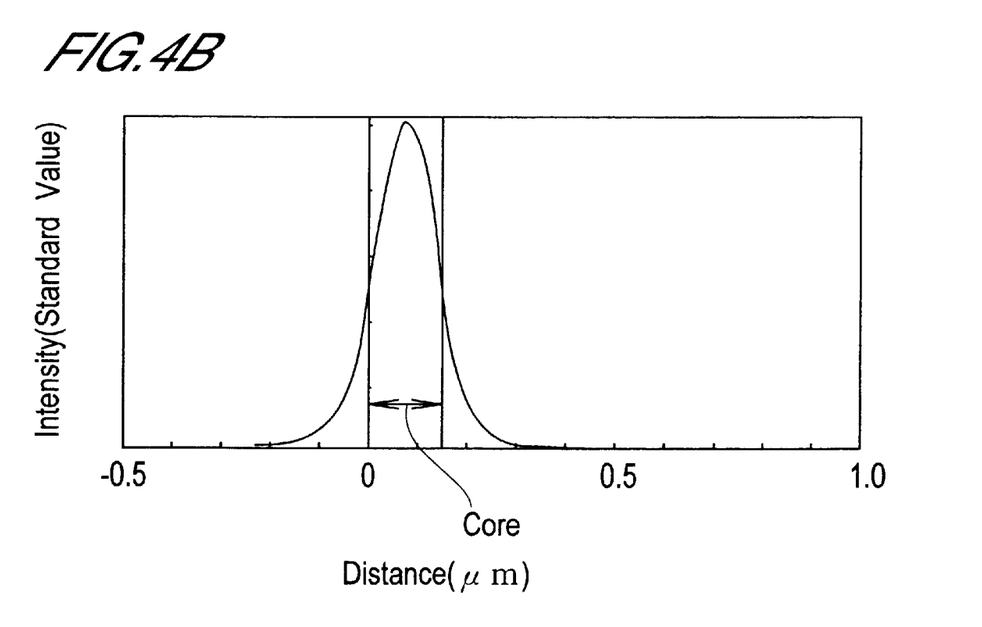
FIG. 4B is a graph showing the results of measuring the near field pattern in an optical waveguide device related to the first embodiment.

Further, in an optical waveguide device 100 related to this embodiment, since there is a large difference in specific refractive index, the cross-sectional dimensions can be 0.2 μm or less in width, and 0.2 μm in height in order to satisfy single mode conditions. That is, in this embodiment, the cross-sectional dimensions can be made less than $\frac{1}{20}^{th}$ of those (width 4–10 μm, and height 4–10 μm) in the case of the above-mentioned paper. Therefore, an optical waveguide device 100 related to this embodiment can be easily manufactured using ordinary semiconductor equipment. FIG. 4A is a graph showing the results of field distribution computations in the vertical direction for the substrate 101 of an optical waveguide device 100, and is an example of a case in which the thicknesses of the under cladding 102, core 103, and upper cladding 104 of optical waveguide device 100 were 1 μm, 0.15 μm, and 1 μm. From the computational results of FIG. 4A, it is clear that light is strongly confined within a radius of roughly 0.5 μm in this optical waveguide device 100. Further, FIG. 4B is a graph showing the results of measuring the near field pattern of optical waveguide device 100. From the measurement results of FIG. 4B, it is clear that light is strongly confined within a radius of roughly 0.3 μm in optical waveguide device 100. From the graphs of FIG. 4A and FIG. 4B, it was possible to confirm that light is propagated in a single mode in optical waveguide device 100 of this embodiment. This is indicative of the fact that if there is a large difference in specific refractive index, a single mode, low-loss optical waveguide can be achieved even when the cross-sectional dimensions of the core are small.

If the width and height of a core are set at 0.3 µm or less, it is possible to produce an optical waveguide that has sufficiently small light loss.

As explained hereinabove, according to an optical waveguide device 100 related to this embodiment, the difference in specific refractive index between core 103 and claddings 102, 104 can be made large, and consequently, the core radius of curvature can be lessened, and, in addition, the core cross-sectional dimensions can be reduced. Therefore, according to this embodiment, an optical circuit can be made smaller than a conventional optical waveguide device, and, in addition, manufacturing can be easily performed using ordinary semiconductor equipment.

In addition, according to this embodiment, because an optical waveguide device is manufactured using an SOI wafer, the number of manufacturing processes can be reduced, and manufacturing costs can be lowered.

Second Embodiment

Next, an optical waveguide device and manufacturing method therefor related to a second embodiment of the present invention will be explained using FIG. 5.

This embodiment is an example in which the optical waveguide described in the first embodiment is used as a 1×2 coupler.

Figure 5:
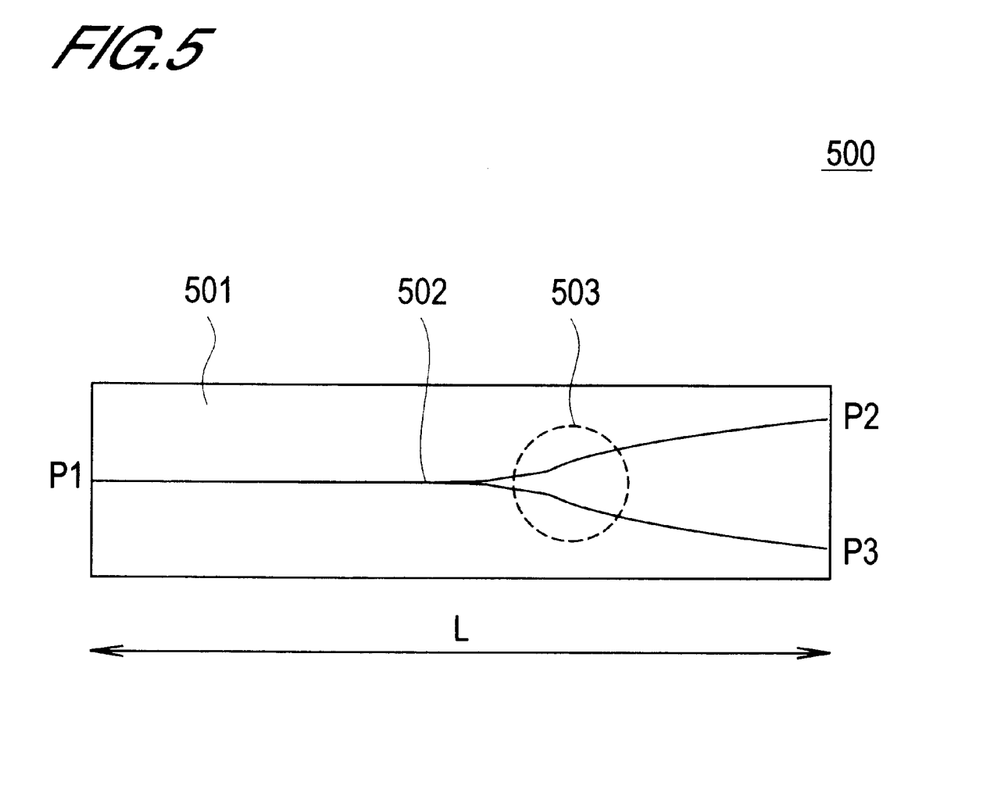
FIG. 5 is a plan view schematically showing a structure of an optical waveguide device related to a second embodiment.

FIG. 5 is a plan view schematically showing the structure of a 1×2 coupler 500 related to this embodiment.

In FIG. 5, a core 502 is disposed on top of an under cladding of an SOI substrate, that is, an embedded silicon oxide layer 501. The surfaces of under cladding 501 and core 502 are covered by an upper cladding not shown in the figure. Core 502 is constituted such that light entering from port P1 is split into two portions of 50% each, and exits from ports P2, P3.

In this embodiment also, just like the first embodiment explained hereinabove, the under cladding 501 and upper cladding (not shown in the figure) are formed using silicon oxide, and the core 502 is formed with silicon. Further, the thicknesses of the under cladding and upper cladding layers, and the cross-sectional dimensions of the core 502 can be made the same as those of the first embodiment.

According to a 1×2 coupler 500 related to this embodiment, the difference in specific refractive index of the core 502 and the claddings can be made around 50-times that of the above-mentioned paper just like in the first embodiment, and consequently, the radius of curvature of the curved portion of the core, on average, can be made less than $\frac{1}{10}^{th}$ that of the above-mentioned paper. Therefore, the overall length L of 1×2 coupler 500 (refer to FIG. 5) can be shortened, enabling same to be made compact.

Further, according to this embodiment, the core cross-sectional dimensions can be reduced just like in the first embodiment, consequently enabling manufacturing with ordinary semiconductor equipment to be made easier.

In addition, 1×2 coupler 500 related to this embodiment can also be manufactured using a SOI wafer the same as in the case of the first embodiment, and consequently, the number of manufacturing processes can be reduced, and manufacturing costs can be lowered.

In this embodiment, a case in which an optical waveguide related to the present invention was used as a 1×2 coupler was explained, but the present invention can be applied to an N×M coupler (N, M being natural numbers), and furthermore, can also be applied to other optical circuits, such as, for example, an array waveguide lattice-type combiner/splitter, a directional coupler, and a Mach-Zehnder circuit.

Third Embodiment

Next, an optical waveguide device and manufacturing method therefor related to a third embodiment of the present invention will be explained using FIG. 6.

This embodiment is an example in which the optical waveguide described in the first embodiment is applied to a thermo-optical switch that makes use of a 2×2-type symmetrical Mach-Zehnder interferometer circuit.

Figure 6A:
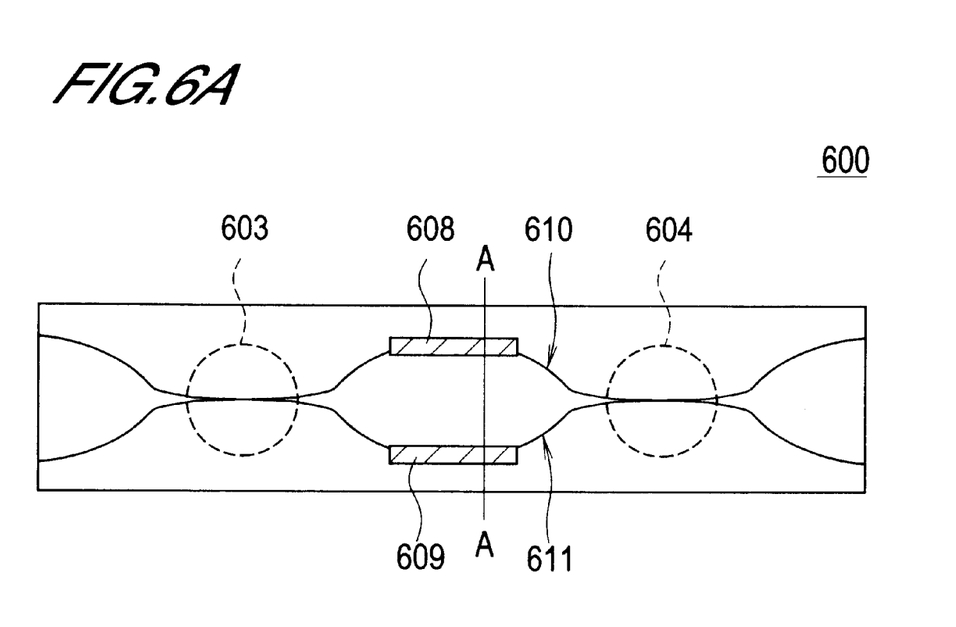
FIG. 6A is a plan view schematically showing a structure of an optical waveguide device related to a third embodiment.
Figure 6B:
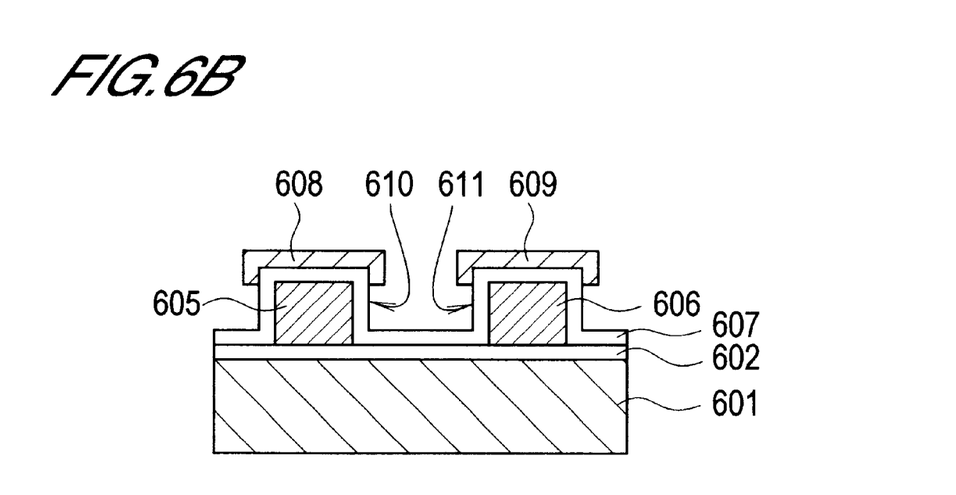
FIG. 6B is a cross-sectional view of A—A of FIG. 6A.

FIG. 6A is a plan view schematically showing the structure of a thermo-optical switch 600 related to this embodiment, and FIG. 6B is a cross-sectional view of A—A of FIG. 6A.

As shown in FIG. 6A and FIG. 6B, under cladding 602 is formed on top of silicon substrate 601, and furthermore, two 3 dB directional couplers 603, 604 are formed by an optical waveguide on this under cladding 602. Further, the cores of these 3 dB directional couplers 603, 604 are connected by the cores 605, 606 of two connection waveguides 610, 611. Furthermore, on top of these cores 605, 606, heaters 608, 609 are disposed by way of upper cladding 607.

The same as the first embodiment explained hereinabove, under cladding 602 and upper cladding 607 are formed using silicon oxide, and the cores (605, 606 and so forth) are formed using silicon. Further, heaters 608, 609 can be formed, for example, using chromium (Cr). Just like in the first embodiment, the thicknesses of under cladding 602 and upper cladding 607 are both 1–5 µm, and the cross-sectional dimensions of the cores are a width of 0.2 µm or less, and a height of 0.2 µm or less.

In a thermo-optical switch 600 of a constitution such as this, by causing heaters 608, 609 to generate heat, it is possible to perform cross-bar-type switching using the thermo-optical effect of a quartz layer. Furthermore, because the principle of this thermo-optical switch 600 is well known, an explanation will be omitted.

According to an optical waveguide related to the present invention, core cross-sectional dimensions can be reduced due to the reasons explained hereinabove, and consequently, the thicknesses of the under cladding and upper cladding can be reduced. For this reason, in a thermo-optical switch 600 of this embodiment, the quantity of heat when heating waveguides 610, 611 can be lessened, and consequently, the power consumption of heaters 608, 609 can be reduced. Further, silicon, which is the core forming material in the present invention, has higher thermal conductivity than the silicon oxide that is the core forming material in the waveguide of the above-mentioned paper, and this fact also enables the power consumption of heaters 608, 609 to be reduced. According to studies carried out by the inventors of the present invention, in a thermo-optical switch 600 related to this embodiment, power consumption can be reduced to less than a half of that of a thermo-optical switch that uses the optical waveguide of the above-mentioned paper.

Furthermore, in a thermo-optical switch 600, because the quantity of applied heat can be lessened, it is also possible to shorten switching time (that is, the time required to heat an optical waveguide).

In addition, according to this embodiment, the core radius of curvature can be reduced the same as the above-described first embodiment, and consequently, switch 600 can be made smaller overall, and core cross-sectional dimensions can be reduced. In accordance therewith, this embodiment enables manufacturing with ordinary semiconductor equipment to be made easier.

Further, the thermo-optical switch 600 of this embodiment can also be manufactured using a SOI wafer, and in accordance therewith, the number of manufacturing processes can be reduced, and manufacturing costs can be lowered.

Furthermore, in this embodiment, there was given an example in which an optical waveguide related to the present invention was applied to a thermo-optical switch, which used a 2×2-type symmetrical Mach-Zehnder interferometer circuit, and this embodiment can be used in an N×N-type (N is a natural number) symmetrical Mach-Zehnder interferometer circuit.

Fourth Embodiment

Next, a fourth embodiment of the present invention will be explained using FIG. 7.

This embodiment is an example in which an optical circuit and an electronic circuit are formed on top of the same SOI substrate.

Figure 7A:
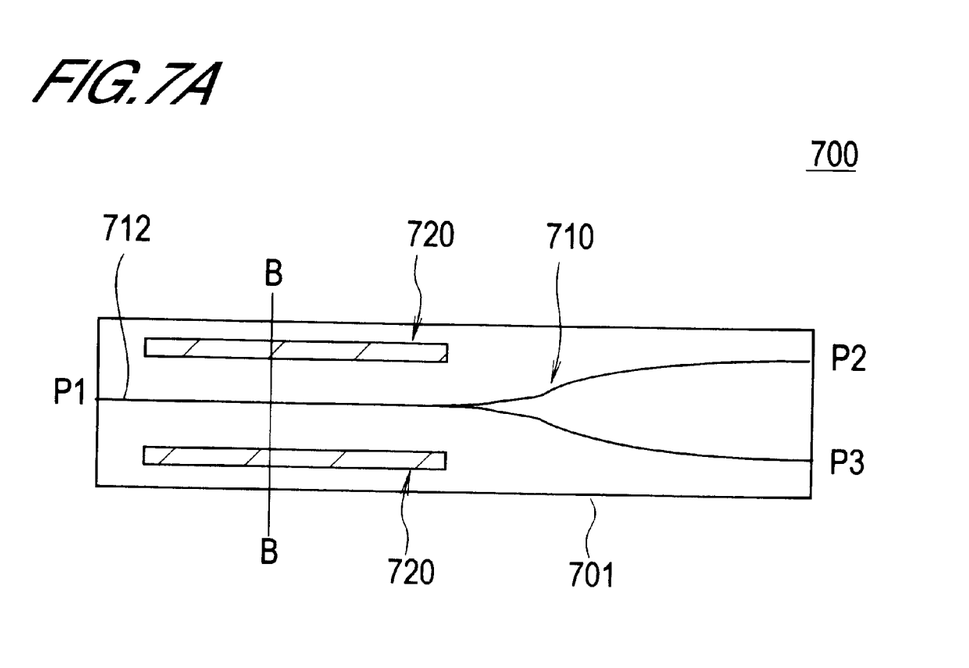
FIG. 7A is a plan view schematically showing a structure of an optical waveguide device related to a fourth embodiment.
Figure 7B:
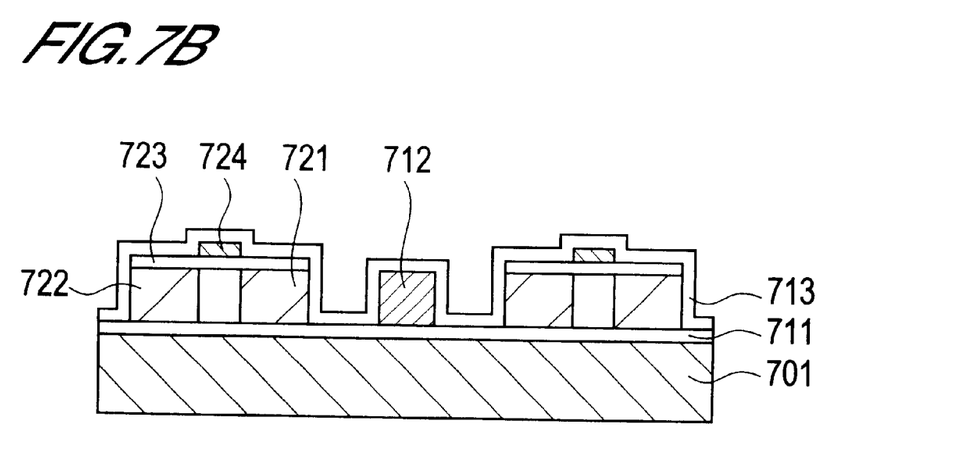
FIG. 7B is a cross-sectional view of B—B of FIG. 7A.

FIG. 7A is a plan view schematically showing an optical waveguide device related to this embodiment, and FIG. 7B is a cross-sectional view of B—B of FIG. 7A.

As shown in FIGS. 7A and 7B, a 1×2 coupler 710, and electronic circuit portions 720, 720 are formed on top of a silicon substrate 701.

In 1×2 coupler 710, a core 712 is disposed on top of an under cladding 711. Then, this under cladding 711 and core 712 are covered by an upper cladding 713. Port P2, for example, receives the outputted light of a semiconductor laser not shown in the figure, and guides this light to port P1. Further, port P3, for example, outputs to a laser diode not shown in the figure light received via port P1.

Electronic circuit portion 720 comprises, for example, a metal oxide semiconductor (MOS) transistor. This MOS transistor comprises a source 721, a drain 722, a gate oxide layer 723 and a gate 724. A protective layer covering this MOS transistor is integrally formed with upper cladding 704. As electronic circuit portion 720, it is possible, for example, to form a semiconductor laser for outputting light to the optical waveguide, a photodiode for converting the light of the optical waveguide to electricity, a peripheral circuit of this photodiode (amplifying circuit or the like), and a drive circuit. Further, it is also possible to mount a bipolar transistor.

According to this embodiment, because an optical waveguide and an electronic circuit are formed on top of the same substrate, the overall device can be made smaller, and power consumption can be reduced.

Further, a device 700 related to this embodiment can also be manufactured using an SOI wafer the same as the cases of each of the embodiments described hereinabove. In a case in which a SOI wafer is used, because the manufacturing process for an optical waveguide can be used in common with the manufacturing processes of an electronic circuit, the number of manufacturing processes can be reduced even further than in the cases of each of the embodiments described hereinabove.

Furthermore, because differences in specific refractive index can be made larger, it is possible to reduce the radius of curvature, and minimize core cross-sectional dimensions, a fact which holds the same for each of the embodiments described hereinabove.

What is claimed is:

1. An optical waveguide device, comprising:

an under cladding, which is formed from silicon oxide;

a core, which is formed on top of the under cladding with silicon, and which propagates light; and an upper cladding, which is formed from silicon oxide, and which covers the side surfaces and upper surface of said core;

wherein the width and height of said core are 0.3 $\mu$m or less.

2. An optical waveguide device, comprising:

an under cladding, which is formed from silicon oxide;

a core, which is formed on top of the under cladding with silicon, and which propagates light; and an upper cladding, which is formed from silicon oxide, and which covers the side surfaces and upper surface of said core;

wherein the radius of curvature of said core is 0.5–1.0 mm.

3. An optical waveguide device manufacturing method, comprising the steps of:

forming a core by etching the silicon layer of a Silicon on Insulator substrate using a mask pattern, and exposing a silicon oxide layer used as an under cladding; and forming an upper cladding by depositing a silicon oxide film on surfaces of said core and said under cladding;

wherein the width and height of said core is 0.3 $\mu$m or less.

4. An optical waveguide device manufacturing method, comprising the steps of:

forming a core by etching the silicon layer of a Silicon on Insulator substrate using a mask pattern, and exposing a silicon oxide layer used as an under cladding; and forming an upper cladding by depositing a silicon oxide film on surfaces of said core and said under cladding;

wherein the radius of curvature of said core is 0.5–1.0 mm.

* * * * *